United States Patent [19]

Raviv et al.

[11] Patent Number: 5,683,297
[45] Date of Patent: Nov. 4, 1997

[54] HEAD MOUNTED MODULAR ELECTRONIC GAME SYSTEM

[76] Inventors: Roni Raviv, 7 Maccabi Street, Ness Ziona 70400, Israel; Omri Rothschild, 16 Barak Street, Zahala, Tel Aviv 69933, Israel

[21] Appl. No.: 358,011

[22] Filed: Dec. 16, 1994

[51] Int. Cl.$^6$ ................................... G09G 5/00
[52] U.S. Cl. ................. 463/34; 463/31; 463/44; 345/8; 434/307; 273/DIG. 17; 359/630; 359/634
[58] Field of Search ............ 273/85 G, 148 B, 273/433–438, 460, DIG. 28, DIG. 17; 364/410; 345/7–10, 13–14, 87, 80; 359/462, 464–467, 477, 629–630, 634; 434/307 R, 308, 314; 463/1, 7–9, 30, 31, 33, 34, 35, 36, 43, 44, 39

[56] References Cited

U.S. PATENT DOCUMENTS

| | | | |
|---|---|---|---|
| H779 | 5/1990 | Verona | 345/8 |
| 509,078 | 2/1893 | Gerlitz et al. | |
| 3,170,979 | 2/1965 | Baldwin et al. | 345/8 |
| 4,398,799 | 8/1983 | Swift | |
| 4,542,903 | 9/1985 | Yokoi et al. | 273/85 G |
| 4,589,659 | 5/1986 | Yokoi et al. | 273/85 G |
| 4,636,866 | 1/1987 | Hattori | 345/87 |
| 4,799,677 | 1/1989 | Frederiksen | 273/DIG. 28 |
| 4,853,764 | 8/1989 | Sutter | |
| 4,895,376 | 1/1990 | Chiang Shiung-Fei | 273/85 G |
| 4,976,429 | 12/1990 | Nagel | 273/85 G |
| 4,988,111 | 1/1991 | Gerlitz et al. | |
| 5,003,300 | 3/1991 | Wells | 345/8 |
| 5,014,982 | 5/1991 | Okada et al. | 273/85 G |
| 5,091,719 | 2/1992 | Beamon, III | 345/8 |
| 5,095,798 | 3/1992 | Okada et al. | 273/85 G |
| 5,161,803 | 11/1992 | Ohara | 273/85 G |
| 5,166,778 | 11/1992 | Beamon, III | 345/8 |
| 5,184,830 | 2/1993 | Okada et al. | 273/85 G |
| 5,217,295 | 6/1993 | Tortola et al. | 273/434 |
| 5,265,888 | 11/1993 | Yamamoto et al. | 273/434 |
| 5,276,471 | 1/1994 | Yamauchi et al. | 345/8 |
| 5,286,202 | 2/1994 | de Gyarfas et al. | 273/434 |
| 5,308,086 | 5/1994 | Ueda et al. | 273/434 |
| 5,321,416 | 6/1994 | Bassett et al. | 345/8 |
| 5,322,441 | 6/1994 | Lewis et al. | 345/8 |
| 5,334,991 | 8/1994 | Wells et al. | 359/630 |
| 5,357,604 | 10/1994 | San et al. | |
| 5,362,068 | 11/1994 | Liu | |
| 5,368,309 | 11/1994 | Monroe et al. | 273/437 |
| 5,392,158 | 2/1995 | Tosaki | 359/630 |
| 5,406,415 | 4/1995 | Kelly | 345/7 |
| 5,414,544 | 5/1995 | Aoyagi et al. | 359/630 |
| 5,416,876 | 5/1995 | Ansley et al. | 359/630 |
| 5,421,589 | 6/1995 | Monroe | 273/437 |
| 5,451,976 | 9/1995 | Ito | 345/8 |
| 5,467,205 | 11/1995 | Kuba et al. | 359/630 |
| 5,469,185 | 11/1995 | Lebby et al. | 345/8 |
| 5,473,365 | 12/1995 | Okamura | 359/462 |
| 5,483,307 | 1/1996 | Anderson | 359/630 |
| 5,485,172 | 1/1996 | Sawachika et al. | 345/8 |

*Primary Examiner*—Jessica Harrison
*Assistant Examiner*—Mark A. Sager
*Attorney, Agent, or Firm*—Samuels, Gauthier, Stevens & Reppert

[57] ABSTRACT

A modular electronic game system, mountable on the head of a user or contained in a console, including a viewing surface, an image projection assembly and an image generating module which has a transparent image screen.

12 Claims, 10 Drawing Sheets

HEAD MOUNTED MODULAR ELECTRONIC GAME SYSTEM

FIELD OF THE INVENTION

The present invention relates to electronic games generally.

BACKGROUND OF THE INVENTION

A great variety of electronic Games are known. The following U.S. Pat. Nos. are believed to represent the state of the art: 5,308,086; 5,286,202; 5,265,888; 5,217,295; 5,213,327; 5,184,830; 5,161,803; 5,158,212; 5,095,798; 5,014,982; 4,799,677. LCD cartridge Games are also known and commercially available from Micro Games of America, North Hills, Calif. under the trademark Game Wizard.

SUMMARY OF THE INVENTION

The present invention seeks to provide an improved electronic game.

There is thus provided in accordance with a preferred embodiment of the present invention a head mounted modular electronic game system comprising:

a head mounting assembly defining an image plane;

a viewing surface supported on the head mounting assembly;

an image projection assembly mounted on the head mounting assembly for projecting an image in the image plane onto the viewing surface; and an image generating module including an at least partially transparent image screen which is selectably and replaceably locatable in the image plane.

Preferably, the image generating module comprises a game module or an entertainment module.

The image screen preferably comprises an LCD display.

The viewing surface may be either a transparent viewing surface, which preferably includes a dichroic filter, or a translucent viewing surface, or an opaque viewing surface.

Preferably, the image projection assembly is operative to enlarge the image.

In accordance with one embodiment of the present invention, the system includes a first polarizer having a first polarization direction associated with the module and a second polarizer having a second polarization direction, perpendicular to the first polarization direction, associated with the head mounting assembly at the image plane.

Preferably, the head mounted modular electronic game system includes a control unit which controls the electronic game system and is physically separate therefrom.

There is also provided in accordance with a preferred embodiment of the present invention, a console modular electronic game system including:

a console assembly;

a viewing surface supported on said console assembly;

an image generating assembly mounted in said console assembly for providing an image at said viewing surface.

Preferably, the image generating assembly includes an image projecting assembly and a replaceable image generating module.

Preferably, the image generating module comprises a game module or an entertainment module.

The image generating assembly preferably comprises an LCD display. The viewing surface is preferably diffused.

Preferably, the image projection assembly is operative to enlarge the image.

In accordance with one embodiment of the present invention, the system includes a first polarizer having a first polarization direction associated with the module and a second polarizer having a second polarization direction, perpendicular to the first polarization direction, associated with the console assembly at the image plane. The orientation of the first and second polarizers determines whether the image is viewed as negative or positive.

BRIEF DESCRIPTION OF THE DRAWINGS

The present invention will be understood and appreciated more fully from the following detailed, description, taken in conjunction with the drawing in which.

Appendix A is a net list of controllers shown in FIGS. 1–2B and FIG. 6, of a light source driver and audio interface useful in the embodiments of FIGS. 1 and 6, and of the control of an LCD used in the game system cassettes of FIGS. 1 and 6.

DETAILED DESCRIPTION OF PREFERRED EMBODIMENTS

Figures 1, 2A, 2B:
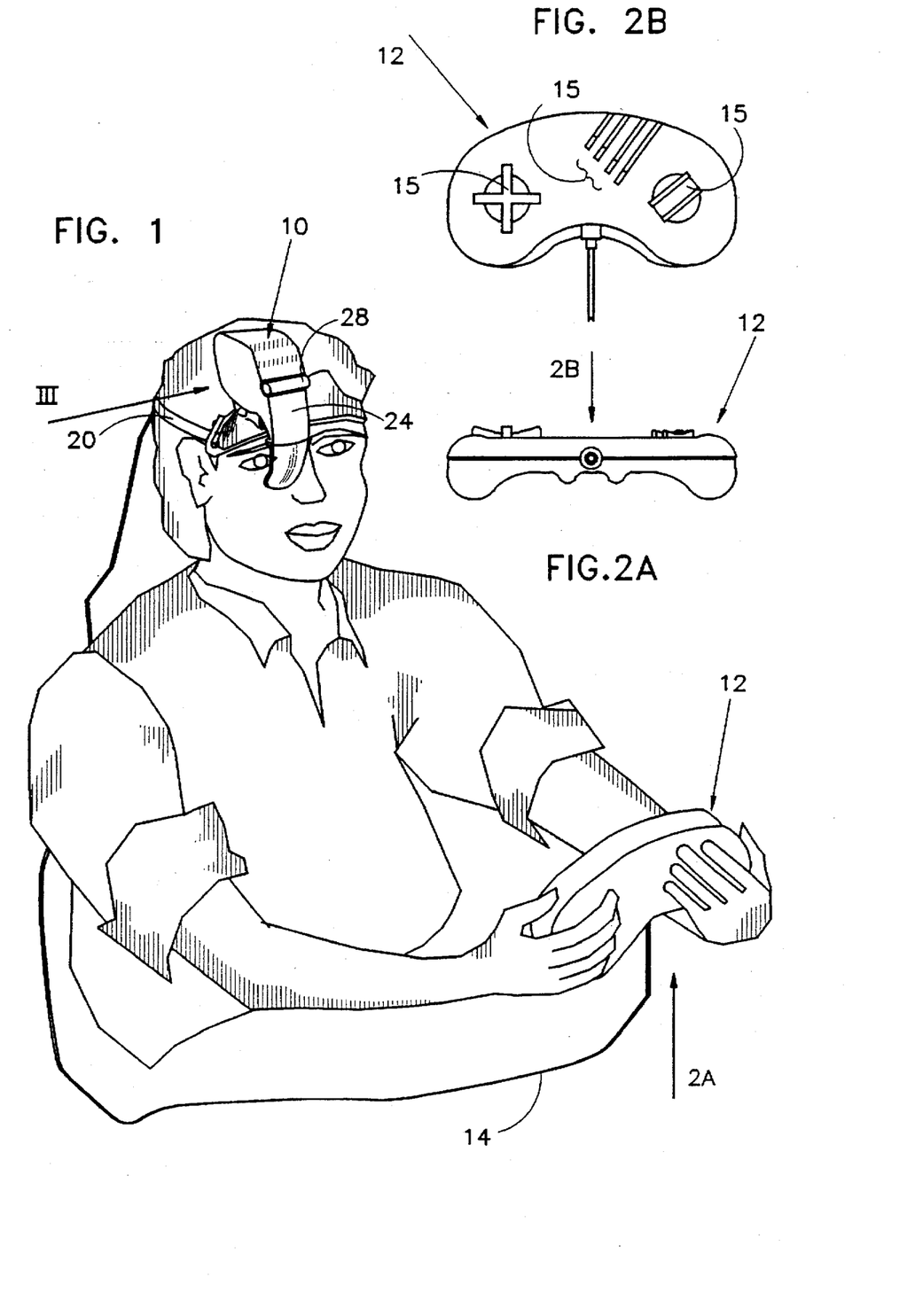
FIG. 1 is a pictorial illustration of a head mounted modular game system in operation.
FIGS. 2A and 2B are respective top view and edge view illustrations of a control unit forming part of the system of FIG. 1.
Figure 3:
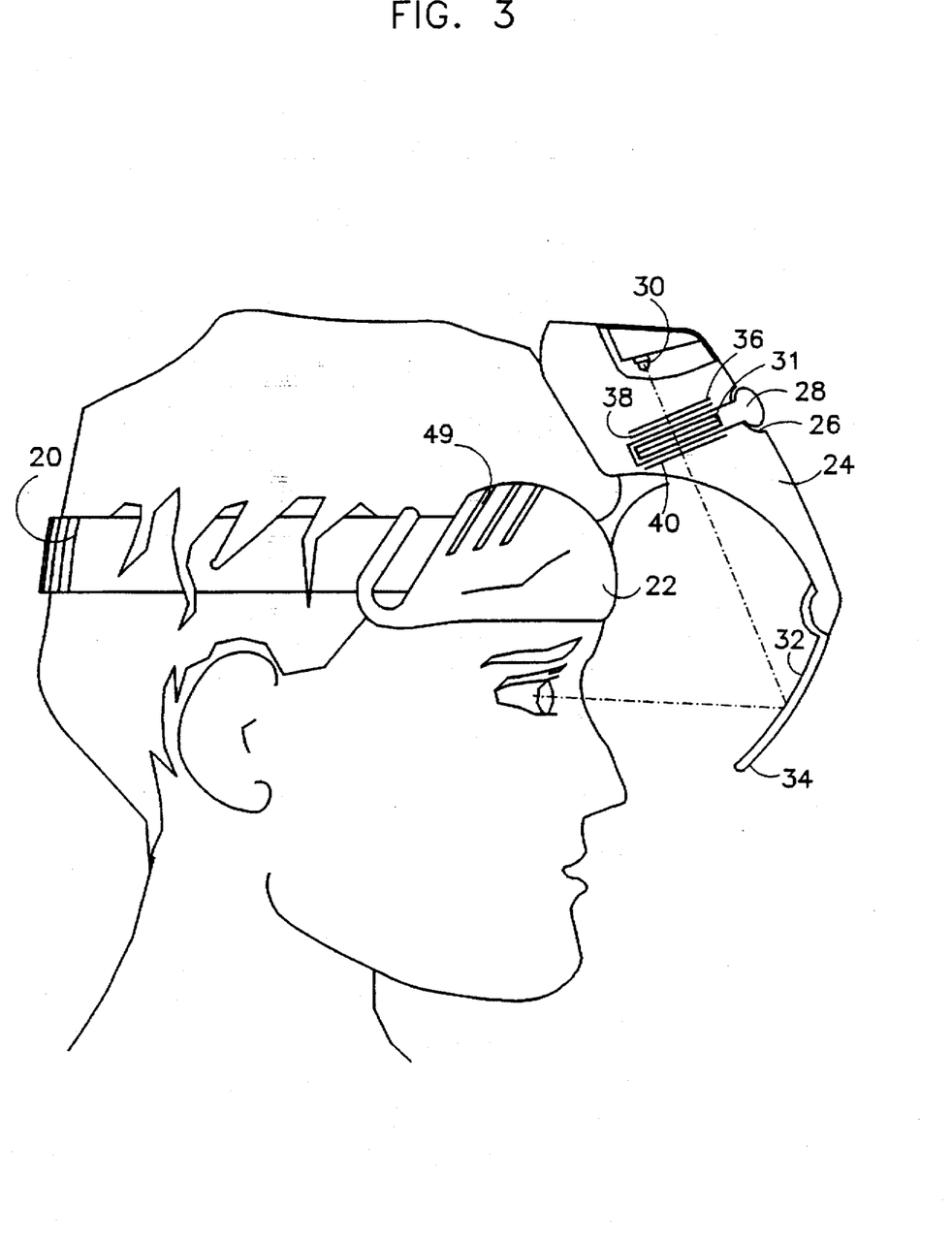
FIG. 3 is a side view illustration of a head mounted unit forming part of the system of FIG. 1.

Reference is now made to FIGS. 1–3, which illustrate a head-mounted modular game system constructed and operative in accordance with a preferred embodiment of the present invention. The system includes a head mounted portion 10 and a hand-held portion 12, which are interconnected by a communications link, such as a communications wire 14 or alternatively, a wireless connection. The hand-held portion 12 includes a plurality of control keys 15.

The head mounted portion 10 includes a head mounting band 20 onto which is mounted a head unit 22 including a housing 24 having a slot 26 into which modular game cassettes 28 may be removably placed for game playing operation. Mounted within housing 24 is a light source 30, such as a light emitting diode, and suitable optics (described below) for projecting an image displayed on a transparent image screen 31, such as an LCD in transmissive mode, in a cassette 28 onto a viewing surface 32, which is preferably pivotably mounted onto housing 24. Viewing surface 32 is preferably a transparent visor 34 which is preferably formed with a dichroic coating to allow the user a view of the outside world at the same time and on the same surface as he sees the image reflected from surface 32. Alternatively, viewing surface 32 may be an opaque or translucent surface.

Figure 4A:
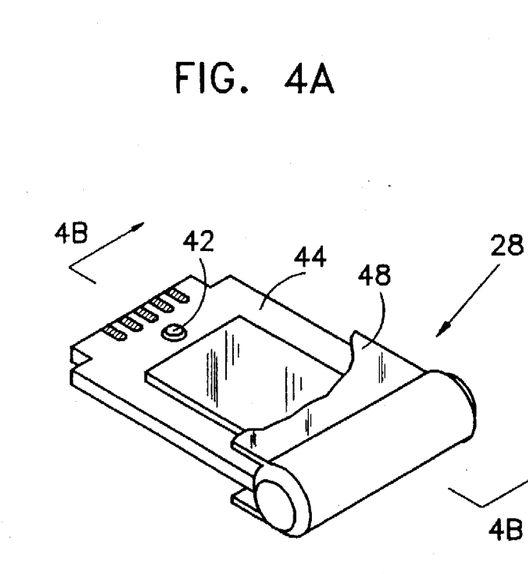
FIGS. 4A and 4B are respective pictorial and sectional illustrations of a game cassette useful in the system of FIG. 1 in accordance with a preferred embodiment of the present invention.
Figure 4B:
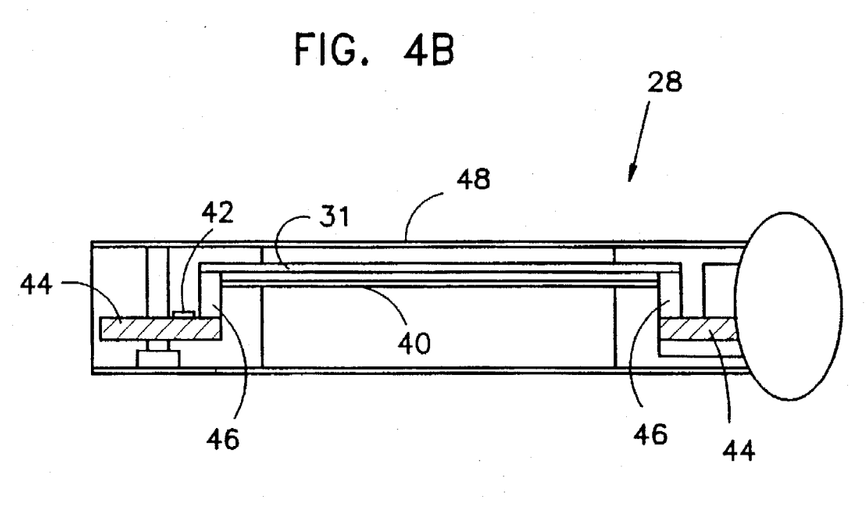

Reference is now made to FIGS. 3–4B. The suitable optics for projecting an image displayed on the transparent image screen 31 in the cassette 28 onto the viewing surface 32, preferably include a diffuser 36, a first polarizer 38 and a second polarizer 40. The transparent image screen 31 is situated between the first 38 and second 40 polarizers. The transparent image screen 31 is optically active and controlled by a microprocessor 42 along with inputs from the hand-held control apparatus 12. The microprocessor 42 selectively activates different portions of the image screen 31, which together with the pair of first 38 and second 40 polarizers, project an image onto the viewing surface 32. As is seen in FIGS. 4A and 4B, the microprocessor 42 and image screen 31 are mounted in the cassette 28 on a printed circuit board 44. The image screen 31 preferably mounts to the printed circuit board 44 by means of a flexible connector 46. The second polarizer 40 is preferably mounted in the cassette 28 behind the image screen 31. A transparent window 48 is preferably provided on the outer case of the cassette 28 to protect the inner components and to let light pass to them.

As seen in FIG. 3, the head unit 22 contains a speaker 49 which provides an audio portion of the game or entertainment.

Figure 5:
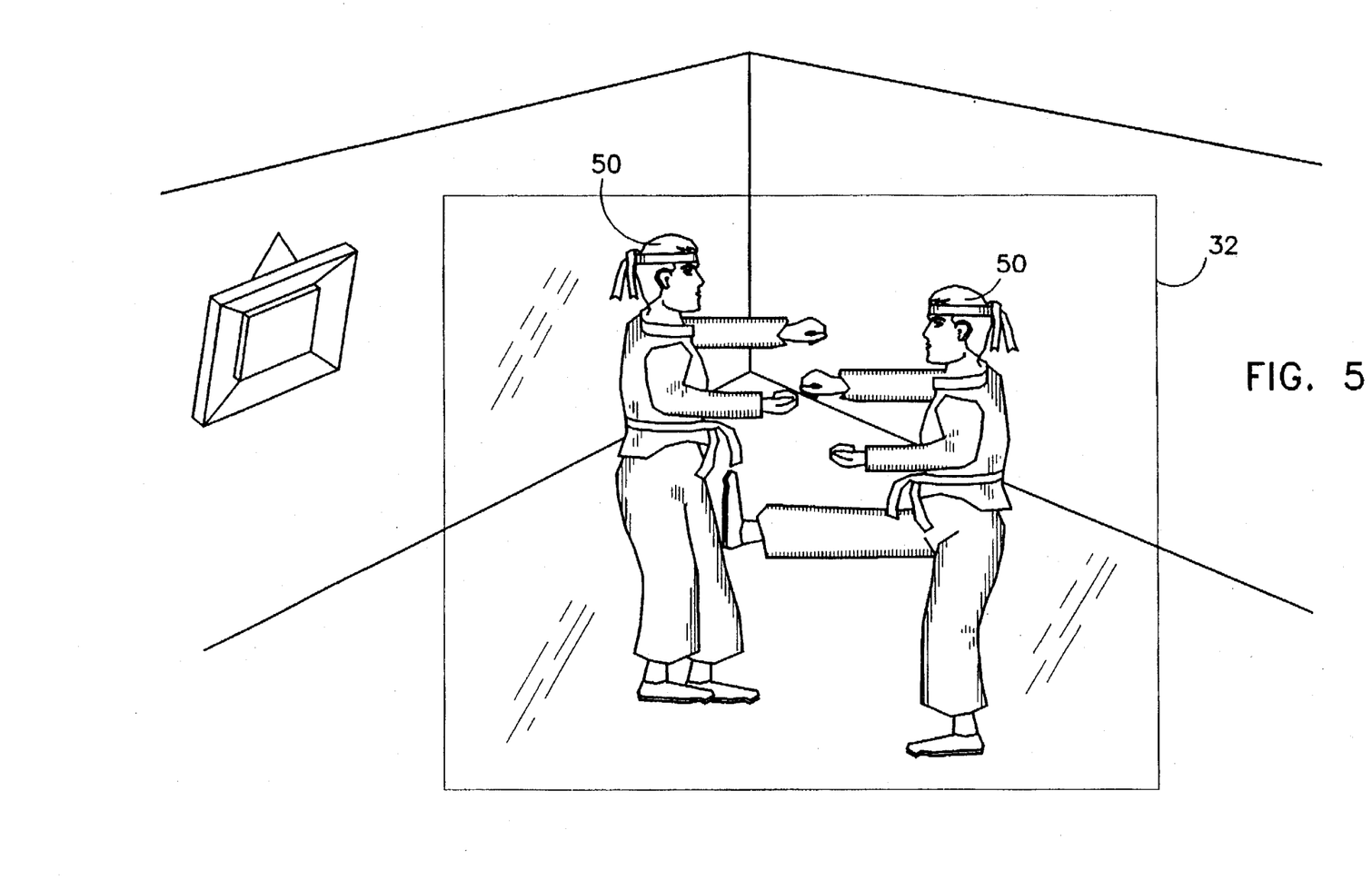
FIG. 5 is an illustration of an image viewable using the system of FIG. 1.

Reference is now made to FIG. 5 which illustrates an image 50 as projected from the image screen 31 of the cassette 28 onto the view screen 32. It is appreciated that the particular game or entertainment cassette in conjunction with the control unit 12 determine the series of images projected on the viewing screen 32. The image 50 is seen by a user as superimposed on the background, such as a room in which the user is located. In a preferred embodiment of the present invention, the view screen 32 is dichroic, in which case the image 50 is seen substantially in one color superimposed on the background which is perceived in substantially every other color except for the color of the image 50. Preferably the view screen 32 has a concave shape which magnifies the image. Typically the radius of curvature of the view screen 32 is approximately 200 mm. It is appreciated by persons skilled in the art that decreasing the radius of curvature increases the magnification of the image 50. The depth of view of the image 50 as perceived by the user is determined by the distance of the image screen 31 from the focal point of the view screen 32. As the distance of the image screen 31 from the view screen 32 approaches the focal point of the view screen 32, the image 50 is perceived by the user at a distance which approaches infinity. Typically the image screen 31 is placed at a distance from the view screen 32 such that the image 50 is perceived at a distance of 1–3 meters.

If the view screen 32 is opaque, the image 50 is seen by one eye, while the background is seen by the other eye.

Figure 6:
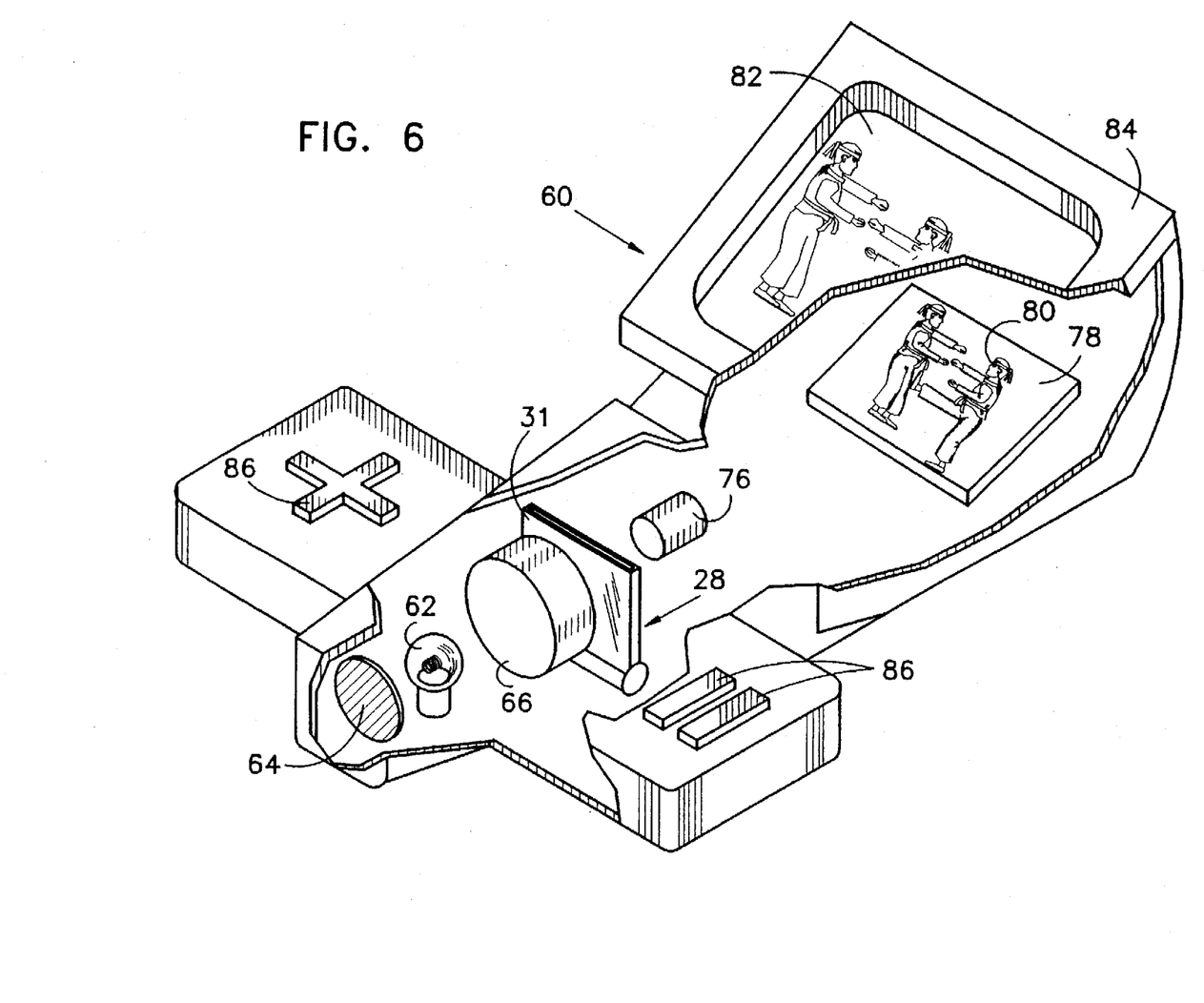
FIG. 6 is a partially cut-away illustration of a console modular game system constructed and operative in accordance with another preferred embodiment of the present invention.
Figure 7:
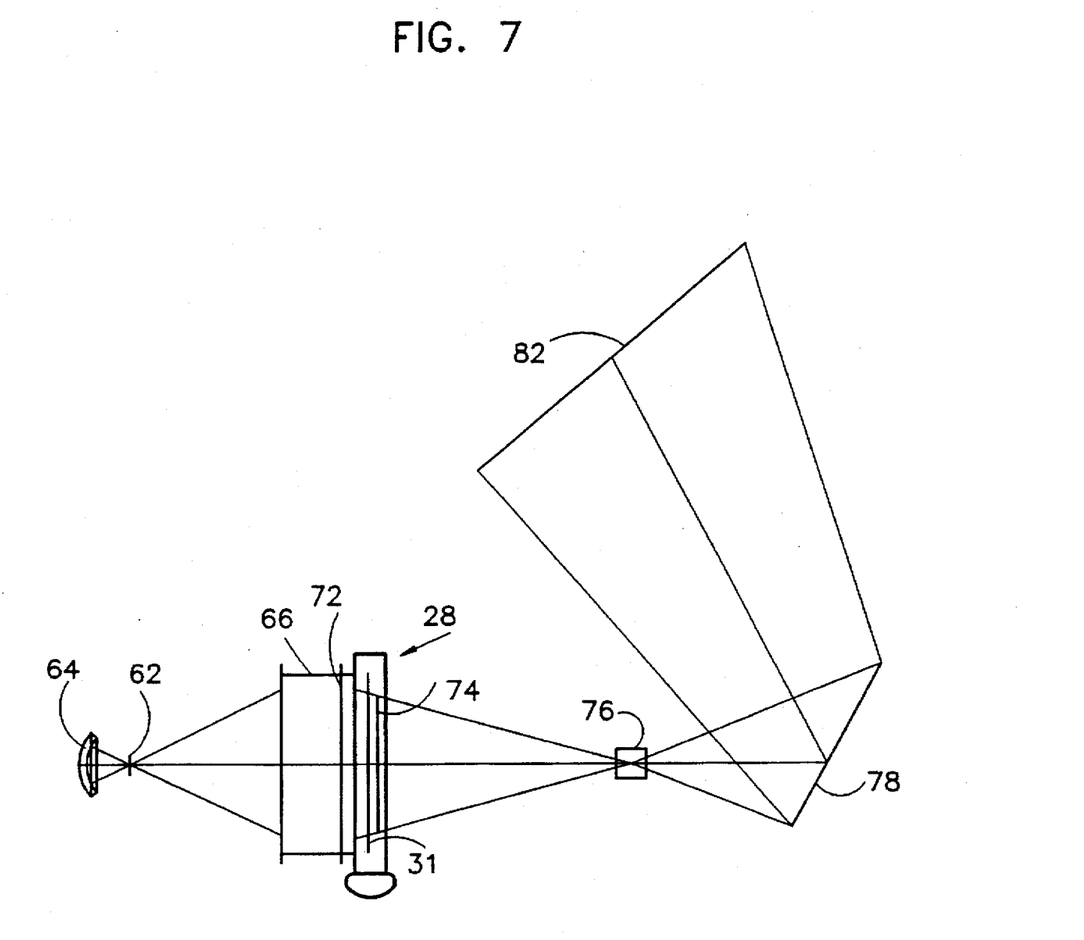
FIG. 7 is a simplified illustration of the optics in the game system of FIG. 6.

Reference is now made to FIG. 6 which illustrates a console modular electronic game system 60 constructed and operative in accordance with another preferred embodiment of the present invention, and to FIG. 7 which illustrates the optical path associated with the game system 60. The game system 60 comprises a light source 62 preferably behind which is situated a reflector 64. The light source 62 emits light, preferably via a condenser 66, towards the game or entertainment cassette 28 used in the embodiment of FIG. 1 and which contains the transparent image screen 31. A first polarizer 72 is situated between the condenser 66 and the image screen 31 and a second polarizer 74 is situated after the image screen 31 inside the cassette 28. A lens 76 is preferably situated between the cassette 28 and a mirror 78 for concentrating and enlarging an image 80 onto the mirror 78. The mirror 78 reflects the image 80 onto a viewing screen 82 which is preferably diffused. A housing 84 houses the various components as well as control keys 86. It is appreciated that the particular game or entertainment cassette 28 in conjunction with the control keys 86 determine the series of images projected on the viewing screen 82. The electronic circuitry associated with the embodiment of FIG. 6 is substantially the same as the circuitry associated with the embodiment of FIG. 1, except that the light source in FIG. 1 is preferably an LED while in FIG. 6 it is preferably an incandescent light source.

Figures 8, 9:
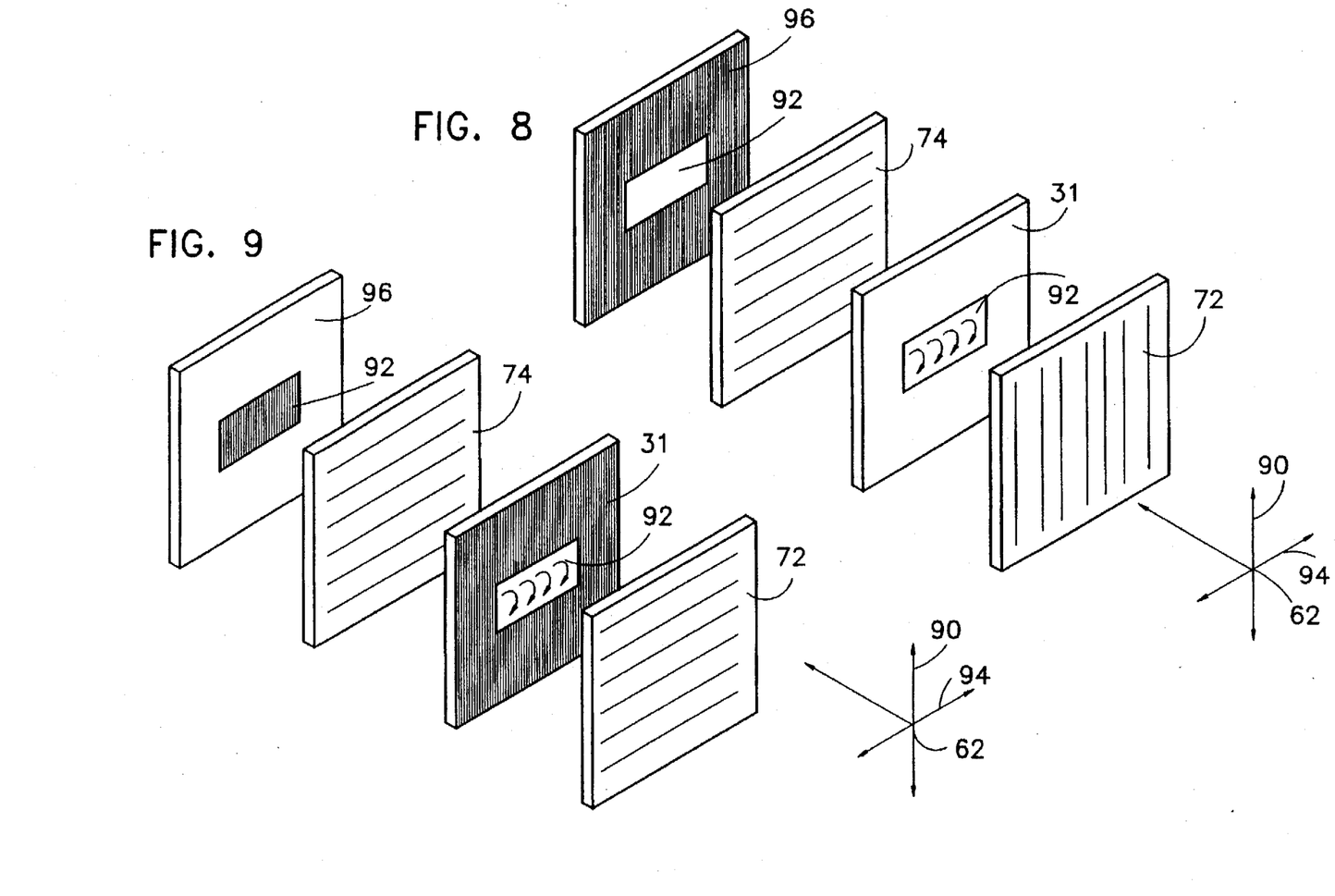
FIGS. 8 and 9 are illustrations of two alternative arrangements of polarizers useful in the system of FIG. 1 or FIG. 6.

Reference is now made to FIGS. 8 and 9 which illustrate the action of the optically active transparent image screen 31 with the first 72 and second 74 polarizers. As is seen in FIG. 8, the light source 62 emits light towards the first polarizer 72 which is oriented to allow light to pass parallel to a vertical polarization axis 90. A microprocessor contained in the cassette 28 of FIGS. 6 and 7 activates an optically active region 92 in image screen 31 which rotates the polarized light which passed through the first polarizer 72 by 90 degrees. The light then passes through the second polarizer 74 which is polarized parallel to an axis 94 which is orthogonal to axis 90. It is seen that light is blocked from passing through the second polarizer 74 in the region 96 by virtue of the polarization of the second polarizer 74 being orthogonal to the polarization of the first polarizer 72. Light passes through the region 92 which is activated to be parallel with the polarization of the second polarizer 74.

Reference is now made to FIG. 9. The light source 62 emits light towards the first polarizer 72 which is now oriented to allow light to pass parallel to the polarization axis 94. A microprocessor contained in the cassette 68 of FIGS. 6 and 7 activates the optically active region 92 in image screen 31 which rotates the polarized light which passed through the first polarizer 72 by 90 degrees. The light then passes through the second polarizer 74 which is polarized parallel to axis 94. It is seen that light passes through the second polarizer 74 in the region 96 by virtue of the polarization of the second polarizer 74 being parallel to the polarization of the first polarizer 72. Light is blocked from passing through the region 92 which is activated to be orthogonal to the polarization of the second polarizer 74.

Figure 10:
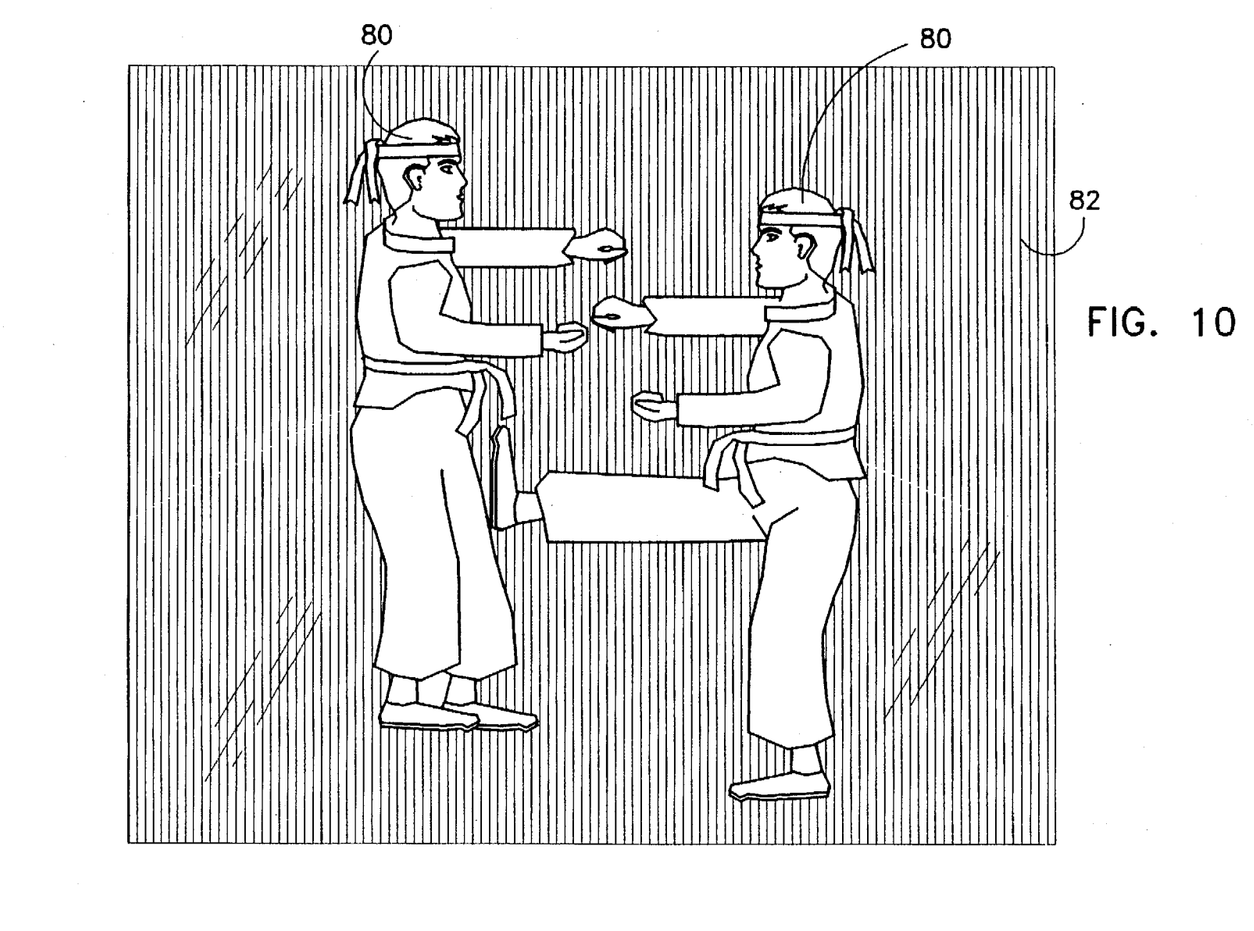
FIGS. 10 and 11 are illustrations of images corresponding to the arrangement of polarizers in FIGS. 8 and 9 respectively.
Figure 11:
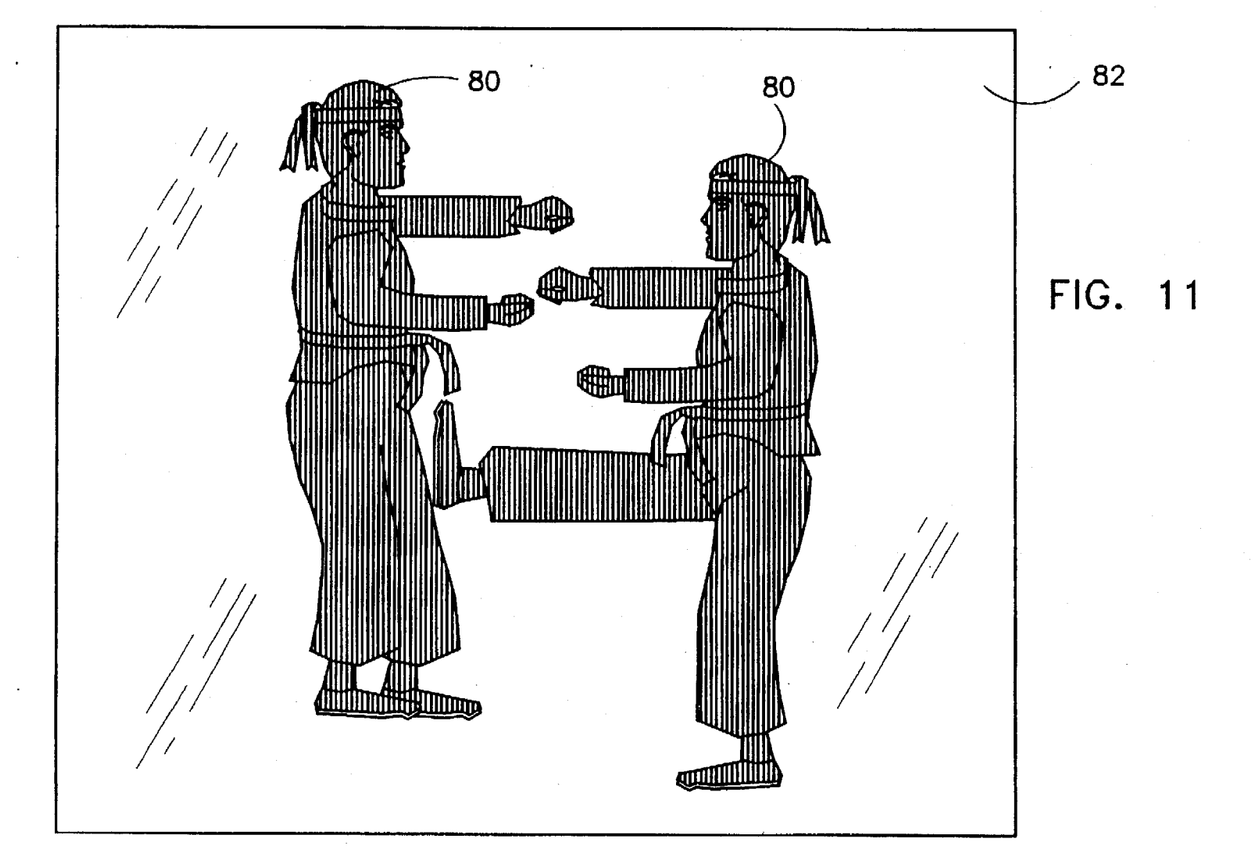

The polarization characteristics described in conjunction with FIGS. 8 and 9 may be used to create differing contrasts as shown in FIGS. 10 and 11. In FIG. 10 the images 80 are seen as bright, whereas the background of the screen 82 is seen as dark. In FIG. 11 the images 80 are seen as dark, whereas the background of the screen 82 is seen as bright.

It is appreciated that the polarization characteristics described in conjunction with FIGS. 8–11 are applicable both for the head mounted modular electronic game system and the console modular electronic game system. The particular polarization may be set at the factory or an adjustment device may be provided for selecting the polarization desired by a user.

Figure 12:
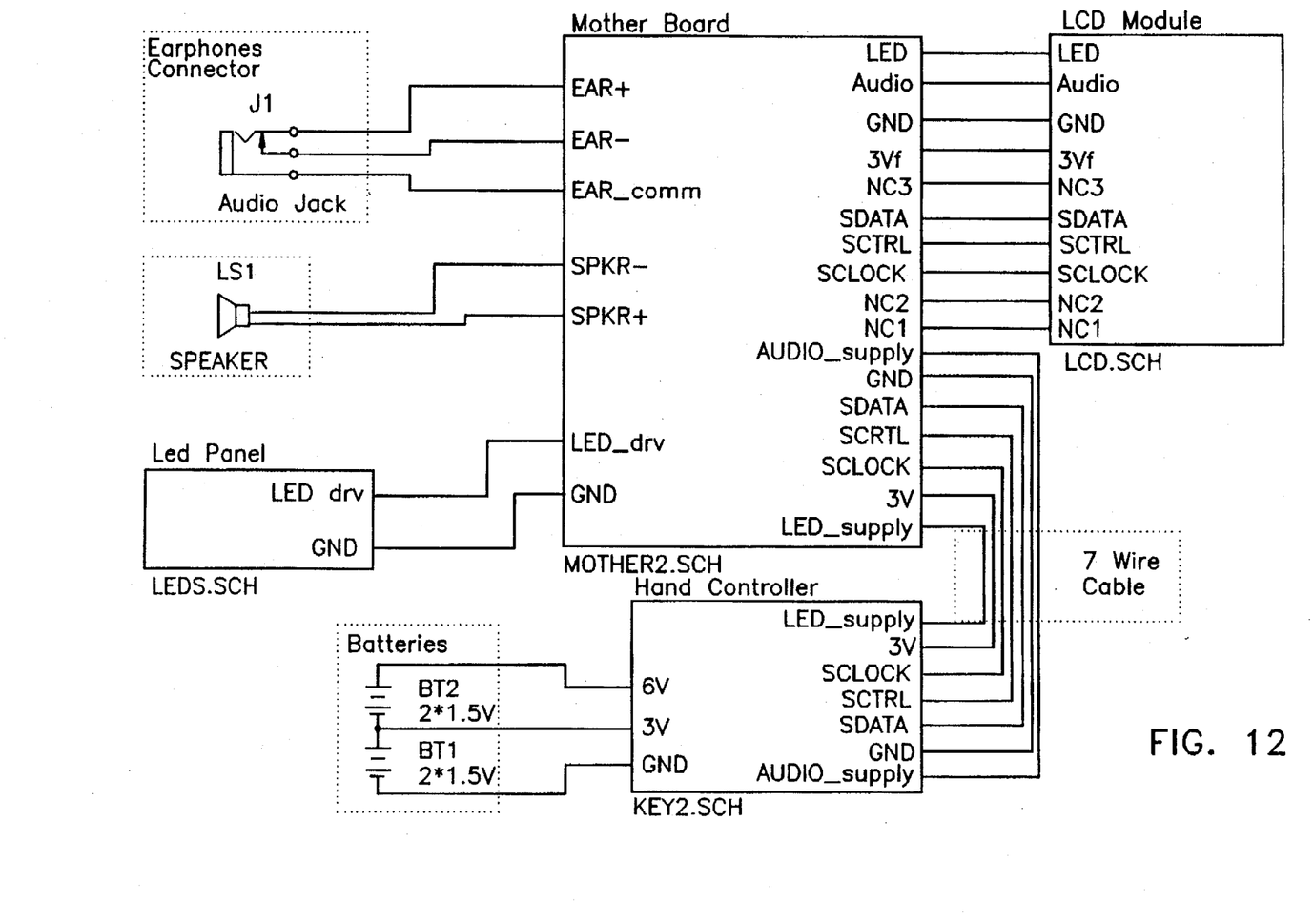
FIG. 12 is a block diagram of the game system shown in FIGS. 1 and 6.

An electrical block diagram of the game system shown in FIGS. 1 and 6 is shown in FIG. 12.

Appendix A is a net list of controllers shown in FIGS. 1–2B and FIG. 6, of a light source driver and audio interface useful in the embodiments of FIGS. 1 and 6, and of the control of an LCD used in the game system cassettes of FIGS. 1 and 6.

It will be appreciated by persons skilled in the art that the present invention is not limited to what has been particularly shown and described above. Rather the scope of the present invention is defined only by the claims which follow:

APPENDIX A

NET LIST IN CALAY FORMAT

| | |
|---|---|
| /N00001 | C1(2) Y1(2) U2(10); |
| /N00002 | Y1(1) C2(2) U2(9); |
| /N00003 | U1(26) U1(27) U2(52) U1(4); |
| /N00004 | U2(23) U1(25); |
| /N00005 | U2(22) U1(24); |
| /N00006 | U2(21) U1(23); |
| /N00007 | U2(20) U1(22); |
| /N00008 | U2(19) U1(21); |
| /N00009 | U2(18) U1(20); |
| /N00010 | U2(17) U1(19); |
| /N00011 | U2(16) U1(18); |
| /N00012 | U1(10) U2(48); |
| /N00013 | U1(9) U2(47); |
| /N00014 | U1(S) U2(46); |
| /N00015 | U1(7) U2(45); |
| /N00016 | U1(6) U2(44); |
| /N00017 | U1(5) U2(43); |
| /N00018 | U1(28) U2(51) U1(3); |
| /N00019 | U1(29) U2(50) U1(2); |
| /N00020 | U1(30) U2(49) U1(1) U1(52); |
| /LED-3 | J3(1) U2(15); |
| /AUDIO-3 | J3(2) U2(13); |
| /N00023 | U1(31) U2(24); |
| /N00024 | U1(32) U2(25); |
| /N00025 | U1(33) U2(26); |
| /N00026 | U1(34) U2(27); |
| /N00027 | U1(35) U2(28); |
| /N00028 | U1(36) U2(29); |
| /N00029 | U1(37) U2(30); |
| /NC3-3 | J3(5); |
| /SDATA-3 | J3(6) U2(3); |
| /SCTRL-3 | J3(7) U2(60); |
| /SCLOCK-3 | U2(53) J3(8); |
| /NC1-3 | J3(9); |
| /NC2-3 | J3(10); |
| /N00036 | U1(38) U2(31); |
| /N00037 | U1(41) U2(32); |
| /N00038 | U1(42) U2(33); |
| /N00039 | U1(43) U2(34); |
| /N00040 | U1(44) U2(35); |
| /N00041 | U1(45) U2(36); |
| /N00042 | U1(46) U2(37); |
| /N00043 | U1(47) U2(39); |
| /N00044 | U1(48) U2(40), |
| /N00045 | U1(49) U2(41); |
| /N00046 | U1(50) U2(42); |
| /N00047 | C3(2) U2(6); |
| /N00048 | R12(2) U3(6) S5(2); |
| /N00049 | R13(2) S4(2) U315); |
| /N00050 | R14(2) S3(2) U3(4); |
| /N00051 | R15(2) S2(2) U3(3); |
| /N00052 | R16(2) S1(2) U3(14); |
| /N00053 | R17(2) S14(2) U3(13); |
| /N00054 | R18(2) U3(12); |
| /N00055 | R19(2) U3(11); |
| /N00056 | U3(9) U4(10); |
| /SCLOCK-4 | U3(2) U4(2) J5(3),; |
| /SCTRL-4 | U3(1) U4(1) J5(4); |
| /N00059 | R11(2) S6(2) U4(11); |
| /N00060 | R10(2) S7(2) U4(12); |
| /N00061 | R4(2) U4(6) S13(2); |
| /N00062 | R5(2) S12(2) U4(5); |
| /N00063 | R6(2) S11(2) U4(4); |
| /N00064 | R7(2) S10(2) U4(3); |
| /N00065 | R8(2) S9(2) U4(14); |
| /N00066 | R9(2) S8(2) U4(13); |
| /SDATA-4 | U4(7) J5(5); |

-continued

APPENDIX A

| | |
|---|---|
| /N00068 | R21(A) J5(1); |
| /N00069 | R20(B) J5(7); |
| /N00070 | Q3(COLLECTOR) J9(1); |
| /N00071 | Q3(EMITTER) R32(1) J10(7); |
| /N00072 | R32(2) R31(2) Q1(COLLECTOR); |
| /N00073 | Q3(BASE) R31(1); |
| /N00074 | QL(BASE) R27(1) R26(1); |
| /LED-5 | R26(2) J6(1); |
| /N00076 | Q4(EMITTER) R29(1) J10(1); |
| /SCLOCK-5 | J6(8) J10(3); |
| /SCTRL-5 | J6(7) J10(4); |
| /SDATA-5 | J6(6) J10(5); |
| /EAR+-5 | J7(1),R25(1); |
| /N00081 | Q4(COLLECTOR) R25(2); |
| /EAR--5 | J7(2) J8(1); |
| /N00083 | J7(3) R28(1); |
| /AUDIO-5 | R24(2) J6(2); |
| /NC3-5 | J6(5); |
| /NC2-5 | J6(9); |
| /N00087 | R29(2) R30(2) Q2(COLLECTOR); |
| /NC1-5 | J6(10); |
| /N00089 | Q4(BASE) R30(1); |
| /N00090 | Q2(BASE) R22(1) R24(1); |
| /N00091 | J2(1) DL(ANODE) D2(ANODE) D3(ANODE); |
| /N00092 | DL(CATHODE) D6(ANODE); |
| /N00093 | D2(CATHODE) D5(ANODE); |
| /N00094 | D3(CATHODE) P4(ANODE); |
| /N00095 | D6(CATHODE) R1(1); |
| /N00096 | D5(CATHODE) R2(1); |
| /N00097 | D4(CATHODE) R3(1); |
| /N00098 | J1(1); |
| /N00099 | J1(2); |
| /N00100 | J1(3); |
| /N00101 | LS1(1); |
| /N00102 | LS1(2); |
| /N00103 | BT2(+); |
| /N00104 | BT2(-) BT1(+); |
| /N00105 | BT1(-); |
| /SVF | C3(1) C1(1) C2(1) J3(4) U2(8) R23(2) J6(4) C10(1), |
| /GND | U2(11) U2(1) J3(3) J5(6) 96(1) S7(1) Sa(1) S9(1), S10(1) S11(1) S12(1) S13(1) U4(15) C6(2) U4(8) C7(2 C8(2) J4(3) S14(11) S1(1) S2(1) S3(1) S4(1) S5(1), U3(15) C5(2) U3(8) U3(10) Cg(2) C10(2) R22(2) R28(2 J8(2) Q2(EMITTER) J6(3) J10(6) R27(2) Q1(EMITTER) J J2(2) R2(2) R3(2); |
| /3V | R20(WIPER) R20(A) J5(2) U4(16) C6(1) R4(1) R5(1) R6 R7(1) R8(1) R9(1) R10(1) R11(1) J4(2) C8(1) U3(16) C5(1) R12(1) R13(1) R14(1) R15(1) R16(1) R17(1) R18 R19(1) R23(1) J10(2); |
| /6V | R21(WIPER) R21(B) J4(1) C7(1); |

Bill Of Materials

| Item | Quantity | Reference | Part |
|---|---|---|---|
| 1 | 2 | BT1,BT2 | 2X1.5V |
| 2 | 2 | C1,C2 | 10p |
| 3 | 1 | C3 | 22n |
| 4 | 3 | C5,C6,C9 | 100n |
| 5 | 3 | C7,C8,C10 | 100u |
| 6 | 6 | D1,D2,D3,D4,D5,D6 | LED |
| 7 | 1 | J1 | Audio Jack |
| 8 | 3 | J2,J8,J9 | CON2 |
| 9 | 2 | J3,J6 | CON10 |
| 10 | 2 | J4,J7 | CON3 |
| 11 | 2 | J5,J10 | CON7 |
| 12 | 1 | LS1 | SPEAKER |
| 13 | 2 | Q1,Q2 | S945 |
| 14 | 2 | Q3,Q4 | S8550 |
| 15 | 3 | R1,R2,R3 | 68 |
| 16 | 20 | R4,,R5,R6,R7,R8,R9,R10, R11,R12,R13,R14,R15,R16, R17,R18,R19,R24,R26,R29, R32 | 10K |
| 17 | 1 | R20 | 500 |
| 18 | 1 | R21 | 1.0K |
| 19 | 2 | R27,R22 | 100K |
| 20 | 1 | R23 | 20 |

-continued

APPENDIX A

| 21 | 1 | R25 | 33 |
|---|---|---|---|
| 22 | 1 | R28 | TBD |
| 23 | 2 | R31,R30 | 470 |
| 24 | 14 | S1,S2,S3,S4,S5,S6,S7,S8,S9,S10,S11,S12,S13,S14 | Button |
| 25 | 1 | U1 | LCD |
| 26 | 1 | U2 | LU510F2C |
| 27 | 2 | U3,U4 | 74HC165 |
| 28 | 1 | Y1 | 32768 Hz |

We claim:

1. A head mounted modular electronic game system comprising:
   a head mounting assembly defining an image plane;
   a view screen supported on said head mounting assembly, said view screen being an only single color reflector transposed in front of only a single eye of a viewer and being operative to reflect an image projected thereonto in only one color only to the single eye of the viewer;
   an optically active transparent image screen mounted in a modular cassette which is removably supported on said head mounting assembly; and
   a light source and optics mounted on the head mounting assembly for projecting an image displayed on said optically active transparent image screen in said image plane onto said view screen.

2. A head mounted modular electronic game system according to claim 1 and wherein said modular cassette comprises a game cassette.

3. A head mounted modular electronic game system according to claim 1 and wherein said modular cassette comprises an entertainment cassette.

4. A head mounted modular electronic game system according to claim 1 and wherein said image screen comprises an LCD display.

5. A head mounted modular electronic game system according to claim 1 and wherein said view screen is a transparent viewing surface.

6. A head mounted modular electronic game system according to claim 1 and wherein said view screen is a translucent viewing surface.

7. A head mounted modular electronic game system according to claim 1 and wherein said view screen is an opaque viewing surface.

8. A head mounted modular electronic game system according to claim 5 and wherein said transparent view screen comprises a dichroic filter.

9. A head mounted modular electronic game system according to claim 1 and wherein said view screen is operative to enlarge said image.

10. A head mounted modular electronic game system according to claim 1 and including a first polarizer having a first polarization direction, said first polarizer being associated with said modular cassette and a second polarizer having a second polarization direction, perpendicular to said first polarization direction.

11. A head mounted modular electronic game system according to claim 10 and wherein said second polarizer is associated with said head mounting assembly at said image plane.

12. A head mounted modular electronic game system according to claim 1 and including a control unit which controls said optically active transparent image screen and is physically separate therefrom.

* * * * *